(12) United States Patent
Bloemer et al.

(10) Patent No.: US 12,345,431 B2
(45) Date of Patent: Jul. 1, 2025

(54) MULTI-ZONE ENVIRONMENTAL CONTROL SYSTEM

(71) Applicant: RESEARCH PRODUCTS CORPORATION, Madison, WI (US)

(72) Inventors: John Bloemer, Sun Prarie, WI (US); Wade Ferkey, Oregon, WI (US); Prabahara Sundar Baladhandapani, Middleton, WI (US)

(73) Assignee: Research Products Corporation, Madison, WI (US)

( * ) Notice: Subject to any disclaimer, the term of this patent is extended or adjusted under 35 U.S.C. 154(b) by 0 days.

(21) Appl. No.: 18/209,270

(22) Filed: Jun. 13, 2023

(65) Prior Publication Data

US 2023/0324065 A1    Oct. 12, 2023

Related U.S. Application Data

(63) Continuation of application No. 16/741,189, filed on Jan. 13, 2020, now Pat. No. 11,713,895.

(60) Provisional application No. 62/792,205, filed on Jan. 14, 2019.

(51) Int. Cl.
| | |
|---|---|
| *F24F 11/52* | (2018.01) |
| *F24F 3/044* | (2006.01) |
| *F24F 11/58* | (2018.01) |
| *F24F 11/59* | (2018.01) |
| *F24F 11/88* | (2018.01) |

(52) U.S. Cl.
CPC .............. *F24F 11/52* (2018.01); *F24F 3/044* (2013.01); *F24F 11/58* (2018.01); *F24F 11/59* (2018.01); *F24F 11/88* (2018.01)

(58) Field of Classification Search
CPC .. F24F 11/52; F24F 11/54; F24F 11/59; F24F 11/88
See application file for complete search history.

(56) References Cited

U.S. PATENT DOCUMENTS

| | | |
|---|---|---|
| 4,308,911 A | 1/1982 | Mandl |
| 4,931,948 A | 6/1990 | Parker et al. |
| 5,181,653 A | 1/1993 | Foster et al. |
| 5,279,609 A | 1/1994 | Meckler |

(Continued)

*Primary Examiner* — Mohammad Ali
*Assistant Examiner* — Vincent W Chang
(74) *Attorney, Agent, or Firm* — Foley & Lardner, LLP (57) ABSTRACT

A multi-zone environmental control system such as an HVAC and/or an IAQ control system includes a control module, a primary user interface, and at least one secondary user interface. The control module is configured to control an environmental system and controlled devices, each device associated with a respective zone. The primary user interface is in communication with the control mode and associated with a first zone. The primary user interface displays information to the user, receives inputs from the user regarding control of at least the first zone, and transmits signals to the control module, which then controls the device associated with the first zone. Each secondary user interface is associated with a zone other than the first zone and is configured to display information to the user, receive an input from the user concerning control of the respective zone, and communicate with the primary user interface. In turn, the primary user interface transmits signals to the control module, which then controls the devices associated with the respective zones.

18 Claims, 7 Drawing Sheets

(56) References Cited

U.S. PATENT DOCUMENTS

| | | |
|---|---|---|
| 5,860,473 A | 1/1999 | Seiden |
| 6,851,621 B1 | 2/2005 | Wacker et al. |
| 6,983,889 B2 | 1/2006 | Alles |
| 6,990,335 B1 | 1/2006 | Shamoon et al. |
| 6,997,390 B2 | 2/2006 | Alles |
| 7,055,759 B2 | 6/2006 | Wacker et al. |
| 7,062,830 B2 | 6/2006 | Alles |
| 7,130,720 B2 | 10/2006 | Fisher |
| 7,156,316 B2 | 1/2007 | Kates |
| 7,162,884 B2 | 1/2007 | Alles |
| 7,188,779 B2 | 3/2007 | Alles |
| 7,207,496 B2 | 4/2007 | Alles |
| D562,261 S | 2/2008 | Takach et al. |
| D562,262 S | 2/2008 | Takach et al. |
| D563,325 S | 3/2008 | Takach et al. |
| 7,360,370 B2 | 4/2008 | Shah et al. |
| D570,791 S | 6/2008 | Takach et al. |
| D571,734 S | 6/2008 | Takach et al. |
| RE40,437 E | 7/2008 | Rosen |
| 7,392,661 B2 | 7/2008 | Alles |
| 7,448,435 B2 | 11/2008 | Garozzo |
| 7,455,236 B2 | 11/2008 | Kates |
| 7,558,648 B2 | 7/2009 | Hoglund et al. |
| 7,575,179 B2 | 8/2009 | Morrow et al. |
| 7,600,694 B2 | 10/2009 | Helt et al. |
| 7,606,635 B2 | 10/2009 | Fisher |
| 7,645,158 B2 | 1/2010 | Mulhouse et al. |
| 7,693,583 B2 | 4/2010 | Wolff et al. |
| 7,693,591 B2 | 4/2010 | Hoglund et al. |
| 7,775,448 B2 | 8/2010 | Votaw et al. |
| 7,775,449 B2 | 8/2010 | Garozzo |
| 7,819,331 B2 | 10/2010 | Arneson |
| 7,837,128 B2 | 11/2010 | Helt et al. |
| 7,854,388 B2 | 12/2010 | Shah et al. |
| 7,904,830 B2 | 3/2011 | Hoglund et al. |
| 7,913,180 B2 | 3/2011 | Hoglund et al. |
| 7,957,839 B2 | 6/2011 | Takach et al. |
| 8,033,479 B2 | 10/2011 | Kates |
| D648,642 S | 11/2011 | Wallaert et al. |
| D667,740 S | 9/2012 | Leung |
| 8,295,981 B2 | 10/2012 | Hadzidedic |
| 8,332,178 B2 | 12/2012 | Simons |
| 8,429,566 B2 | 4/2013 | Koushik et al. |
| 8,452,456 B2 | 5/2013 | Devineni et al. |
| D688,955 S | 9/2013 | Deligiannis et al. |
| 8,527,096 B2 | 9/2013 | Pavlak et al. |
| 8,560,127 B2 | 10/2013 | Leen et al. |
| 8,589,111 B2 | 11/2013 | Simons |
| 8,615,326 B2 | 12/2013 | Filbeck et al. |
| 8,630,740 B2 | 1/2014 | Matsuoka et al. |
| 8,695,888 B2 | 4/2014 | Kates |
| 8,761,945 B2 | 6/2014 | Hadzidedic |
| D715,165 S | 10/2014 | Deligiannis et al. |
| 8,918,219 B2 | 12/2014 | Sloo et al. |
| 8,965,585 B2 | 2/2015 | Lombard et al. |
| 8,977,794 B2 | 3/2015 | Grohman et al. |
| 9,016,593 B2 | 4/2015 | Metselaar |
| 9,020,646 B2 | 4/2015 | Matsuoka et al. |
| D734,178 S | 7/2015 | Lombard et al. |
| 9,075,419 B2 | 7/2015 | Sloo et al. |
| D737,153 S | 8/2015 | Lombard et al. |
| D737,155 S | 8/2015 | Gmyr et al. |
| 9,098,096 B2 | 8/2015 | Matsuoka |
| D738,756 S | 9/2015 | Jiang et al. |
| 9,182,140 B2 | 11/2015 | Kates |
| 9,194,599 B2 | 11/2015 | Kates |
| 9,194,600 B2 | 11/2015 | Kates |
| 9,222,692 B2 | 12/2015 | Kates |
| 9,256,230 B2 | 2/2016 | Matsuoka et al. |
| 9,273,879 B2 | 3/2016 | Kates |
| 9,303,889 B2 | 4/2016 | Kates |
| 9,310,091 B2 | 4/2016 | Hoglund et al. |
| 9,316,407 B2 | 4/2016 | Kates |
| 9,353,963 B2 | 5/2016 | Kates |
| 9,353,964 B2 | 5/2016 | Kates |
| 9,411,703 B2 | 8/2016 | Simons |
| 9,456,297 B2 | 9/2016 | Pi-Sunyer |
| 9,477,240 B2 | 10/2016 | Musunuri et al. |
| D772,085 S | 11/2016 | Howe et al. |
| 9,488,994 B2 | 11/2016 | Zywicki et al. |
| 9,489,062 B2 | 11/2016 | Corcoran et al. |
| 9,491,571 B2 | 11/2016 | Karp et al. |
| 9,513,642 B2 | 12/2016 | Rogers et al. |
| 9,535,411 B2 | 1/2017 | Wei et al. |
| 9,594,384 B2 | 3/2017 | Bergman et al. |
| 9,618,223 B2 | 4/2017 | Kates |
| 9,618,224 B2 | 4/2017 | Emmons et al. |
| 9,623,523 B2 | 4/2017 | Du et al. |
| 9,645,589 B2 | 5/2017 | Leen et al. |
| 9,651,929 B2 | 5/2017 | Horesh et al. |
| 9,664,409 B2 | 5/2017 | Marak et al. |
| 9,668,085 B2 | 5/2017 | Pi-Sunyer |
| 9,678,486 B2 | 6/2017 | Grohman et al. |
| 9,696,052 B2 | 7/2017 | Malchiondo et al. |
| 9,732,980 B2 | 8/2017 | Du et al. |
| 9,838,830 B2 | 12/2017 | Lyons |
| 9,851,727 B2 | 12/2017 | Simon et al. |
| 9,854,386 B2 | 12/2017 | Karp |
| 9,909,777 B2 | 3/2018 | Goyal et al. |
| 9,939,167 B2 | 4/2018 | Hoppe et al. |
| 9,951,965 B2 | 4/2018 | Call et al. |
| 9,952,573 B2 | 4/2018 | Sloo et al. |
| 9,971,364 B2 | 5/2018 | Zywicki et al. |
| 9,982,906 B2 | 5/2018 | Vega |
| 9,995,497 B2 | 6/2018 | Kates |
| 10,012,405 B2 | 7/2018 | Matsuoka et al. |
| 10,048,705 B2 | 8/2018 | Bergman et al. |
| 10,075,828 B2 | 9/2018 | Horton et al. |
| 10,077,915 B2 | 9/2018 | Coporation |
| 10,082,312 B2 | 9/2018 | Vozenilek et al. |
| 10,095,207 B2 | 10/2018 | Ji et al. |
| 10,101,053 B2 | 10/2018 | Hoglund et al. |
| 10,126,009 B2 | 11/2018 | Flaherty et al. |
| 10,126,011 B2 | 11/2018 | Kates |
| 10,145,578 B2 | 12/2018 | Hoglund et al. |
| 10,151,503 B2 | 12/2018 | Matsuoka |
| 10,184,681 B2 | 1/2019 | Du et al. |
| 2005/0156054 A1 | 7/2005 | Shah |
| 2005/0288824 A1* | 12/2005 | Fisher ............... G05D 23/1934 700/277 |
| 2006/0071089 A1 | 4/2006 | Kates |
| 2007/0228183 A1 | 10/2007 | Kennedy et al. |
| 2009/0008463 A1 | 1/2009 | Holland et al. |
| 2013/0178985 A1 | 7/2013 | Lombard et al. |
| 2013/0231792 A1 | 9/2013 | Ji et al. |
| 2013/0333784 A1 | 12/2013 | Marak et al. |
| 2014/0041846 A1 | 2/2014 | Leen et al. |
| 2014/0370879 A1 | 12/2014 | Redding et al. |
| 2015/0148963 A1 | 5/2015 | Klein et al. |
| 2015/0330654 A1 | 11/2015 | Matsuoka |
| 2015/0369503 A1 | 12/2015 | Flaherty et al. |
| 2015/0369504 A1 | 12/2015 | Flaherty et al. |
| 2015/0369507 A1 | 12/2015 | Flaherty et al. |
| 2015/0370272 A1 | 12/2015 | Reddy et al. |
| 2015/0370927 A1 | 12/2015 | Flaherty et al. |
| 2015/0372832 A1 | 12/2015 | Kortz et al. |
| 2015/0372834 A1 | 12/2015 | Karp et al. |
| 2016/0025363 A1 | 1/2016 | Kates |
| 2016/0195296 A1 | 7/2016 | Hoglund et al. |
| 2016/0231013 A1 | 8/2016 | Kates |
| 2016/0334783 A1 | 11/2016 | Simons |
| 2017/0051932 A1 | 2/2017 | Chang et al. |
| 2017/0146261 A1 | 5/2017 | Rogers et al. |
| 2017/0159954 A1 | 6/2017 | Bergman et al. |
| 2017/0176030 A1 | 6/2017 | Emmons et al. |
| 2017/0192402 A1 | 7/2017 | Karp et al. |
| 2017/0234562 A1 | 8/2017 | Ribbich et al. |
| 2017/0234574 A1 | 8/2017 | Marak et al. |
| 2017/0262153 A1 | 9/2017 | Hoglund et al. |
| 2017/0321925 A1 | 11/2017 | Du et al. |
| 2017/0356669 A1 | 12/2017 | Gonia et al. |
| 2018/0010821 A1 | 1/2018 | Marak et al. |
| 2018/0017274 A1 | 1/2018 | Erdman et al. |
| 2018/0058710 A1 | 3/2018 | Lewis |

(56) References Cited

U.S. PATENT DOCUMENTS

| | | |
|---|---|---|
| 2018/0077741 A1* | 3/2018 | Pan .................. H04W 88/02 |
| 2018/0106493 A1 | 4/2018 | Hoglund et al. |
| 2018/0156485 A1 | 6/2018 | Hoglund et al. |
| 2018/0163986 A1 | 6/2018 | Hoglund et al. |
| 2018/0180315 A1 | 6/2018 | Hoglund et al. |
| 2018/0180316 A1 | 6/2018 | Hoglund et al. |
| 2018/0187912 A1 | 7/2018 | Hoppe et al. |
| 2018/0195749 A1 | 7/2018 | Sinha et al. |
| 2018/0224143 A1 | 8/2018 | Anderson et al. |
| 2018/0231995 A1 | 8/2018 | Zywicki et al. |
| 2018/0299151 A1 | 10/2018 | Ajax et al. |
| 2018/0313560 A1 | 11/2018 | Hoglund et al. |
| 2018/0321699 A1 | 11/2018 | Bergman et al. |
| 2019/0212026 A1* | 7/2019 | Kim ..................... F24F 11/65 |
| 2019/0277531 A1 | 9/2019 | Gillette et al. |
| 2019/0353380 A1 | 11/2019 | Gillette et al. |
| 2019/0353381 A1 | 11/2019 | Atchison et al. |
| 2020/0141608 A1 | 5/2020 | Sinha et al. |
| 2020/0217524 A1 | 7/2020 | Atchison |

\* cited by examiner

MULTI-ZONE ENVIRONMENTAL CONTROL SYSTEM

CROSS-REFERENCE TO RELATED APPLICATIONS

This application is a continuation of U.S. patent application Ser. No. 16/741,189, filed Jan. 13, 2020, which claims the benefit of and priority to U.S. Provisional Patent Application No. 62/792,205, filed on Jan. 14, 2019, all of which are incorporated by reference in their entireties herein.

BACKGROUND OF THE DISCLOSURE

1. Field of the Disclosure

The disclosure relates generally to an environmental control system such as a heating, ventilation, and air conditioning (HVAC) system and, in particular, to a control system for a multi-zone environmental control system that controls devices in different zones using a primary user interface capable of controlling the controlled devices and secondary user interfaces associated with individual zones and communicating with the primary user interface.

2. Discussion of the Related Art

Residential and commercial buildings are known to include environmental control systems such as HVAC systems for heating and cooling and/or indoor air quality (IAQ) systems for ventilating, humidifying, dehumidifying, and/or filtering to improve the environment within the building. For the sake of simplicity, the term "environmental control system" will be used herein to include HVAC systems and/or IAQ systems. Environmental control systems may include a variety of controlled devices that control airflow into and/or out of the controlled area and/or that control air quality. These devices include, but are not limited to, dampers and blowers. The control is performed with feedback from sensors such as thermostats and humidity sensors. In some instances, the building may be divided into a number of zones, and the controlled device(s) of each zone may be independently controlled to condition the zone.

Each zone may include its own thermostat or controller that is connected to an electronic control module, typically known as a zone control panel. The zone control panel is typically disposed in a central location, most typically to a primary component of the environmental control system, such as a furnace, in order to facilitate wiring of the zone control panel to the system. The zone control panel is configured to individually receive signals from each thermostat or other sensor and to control the system in response to the signals received directly from the sensors. Setpoints such as a desired temperature or humidity can be programmed into the system by user input.

The typical zoned environmental control system has its software and processing power disposed within the zone control panel. These processors are configured to receive signals from sensors such as thermostats and also require direct user input via buttons or similar devices located on the control panel. Remote thermostats or similar devise act primarily as sensors with limited user input capability. Thus, system set up, testing, and similar actions must be performed at the zone control panel, which often is located at a relatively inaccessible location such as in a utility room.

Zoned environmental control systems also often have a dedicated thermostat associated with each zone. Hence, the user must physically be in a zone to change temperature setpoints or other settings within that zone.

There is a need in the art for a multi-zone environmental control system that includes a primary user interface separate from the zone control panel and disposed in a primary zone of the building for easy access by the user.

There is further need in the art for the primary user interface to be able to receive data and inputs from sensors associated with the various zones, process those inputs, and provide a single set of control signals to the zone control panel.

There is also a need in the art for a multi-zone environmental control system that optimizes function, energy use, and/or operation times based on the temperature and/or IAQ demands of each individual zone.

SUMMARY OF THE DISCLOSURE

In accordance with an aspect of the disclosure, a multi-zone environmental control system may include a control module such as a zone control panel, a primary user interface, and at least one secondary user interface. The control module is configured to control a plurality of controlled devices such dampers, blowers, humidifiers, dehumidifiers, and air cleaners. Each controlled device is associated with a respective one of a plurality of zones. The primary user interface is in communication with the control module and associated with a first zone of the plurality of zones. The primary user interface includes control logic and is configured to display information to a user, receive a plurality of inputs from the user concerning control of at least the first zone, and transmit signals to the control module for controlling the controlled device associated at least the first zone. Each secondary user interface is associated with a zone of the plurality of zones other than the first zone. Further, each secondary user interface is configured to display information to the user and receive at least one input from the user concerning control of the associated zone. Each secondary user interface is also in communication with the primary user interface. In turn, the primary user interface transmits signals to the control module for controlling the controlled devices associated with the various zones based at least in part from information obtained from the secondary user interfaces.

According to another aspect of the disclosure, the primary user interface may include or be in communication with a sensor for sensing an environmental condition, such as temperature or air quality, in the first zone. Additionally, each secondary user interface may include or be in communication with a sensor for sensing an environmental condition in its associated zone. The measurements from each of the plurality of zones are communicated to the primary user interface, and the control logic determines whether the measured parameter of each zone of the plurality of zones satisfies a commanded parameter, such as setpoint temperature or humidity level, of its associated zone. In turn, the primary user interface relays the determination to the control module. When the determination is that the measured parameter of at least one zone does not satisfy the commanded parameter for that zone, the control module activates at least one controlled device associated with the at least one zone. On the other hand, when the determination is that the measured parameters of the plurality of zones meets the commanded parameters, the control module deactivates the controlled devices.

According to another aspect of the disclosure, the primary user interface may include a wi-fi module to communicate with a mobile application via an external server.

According to yet another aspect of the disclosure, at least one of the plurality of inputs received by the user at the primary user interface may concern the commanded parameters of a zone other than the first zone, for example, a second zone or a third zone. Such inputs may then be communicated to the associated secondary user interface associated with that zone. In turn, the secondary user interface is able to display the adjusted commanded parameter. In addition, inputs received by the user at any of the secondary user interfaces are communicated to the primary user interface.

According to another aspect of the disclosure, the control logic may monitor operation time of an environmental control system over a predetermined period of time. If the operation time of the system over the predetermine period of time is less than a lower limit, the control module may then deactivate the environmental control system or components thereof to satisfy the lower limit.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

In describing the preferred embodiment of the disclosure which is illustrated in the drawings, specific terminology will be resorted to for the sake of clarity. However, it is not intended that the disclosure be limited to the specific terms so selected and it is to be understood that each specific term includes all technical equivalents which operate in a similar manner to accomplish a similar purpose.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure and the various features and advantageous details thereof are explained more fully with reference to the non-limiting embodiments described in detail in the following description.

Figure 1:
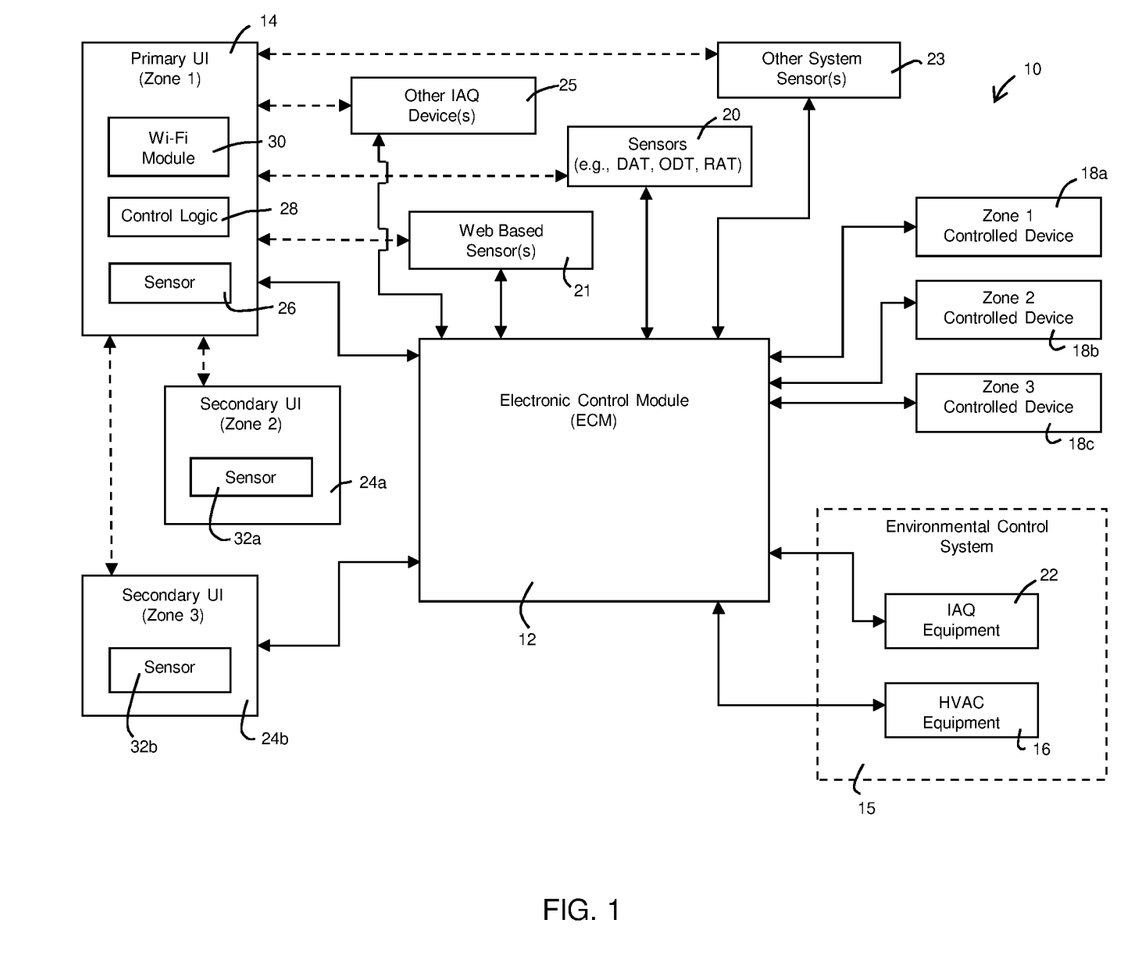
FIG. 1 is a schematic diagram of a multi-zone environmental control system according to an embodiment of the disclosure.

Referring first to FIG. 1, a multi-zone environmental conditioning system 10 includes an electronic control module (ECM) 12 in communication with a primary user interface or "UI" 14, an environmental control system 15 and at number of controlled devices 18. ECM 12 may be any component configured to control one or more components of the system 10. ECM 12 may include a computing device, processor, hardware, or software logic or a combination therefore. The environmental control system 15, typically configured to operate within a structure, may include an HVAC system 16 within the structure that may include a heater, an air conditioner, and/or a ventilation fan. Instead of or in addition to an HVAC system, the environmental control system 15 may include an IAQ system 22 including, for example, a humidifier, a dehumidifier, a filtration unit, and/or an additional ventilation unit. The controlled devices 18 may comprise any of a number of devices that are selectively controlled to alter an environmental condition in the various zones. A non-limiting example of a controlled device 18 is a zone damper, controlling airflow into or out of an associated zone from an environmental control device and/or for controlling outside airflow into the controlled zone. The ECM 12 may also be in communication with at least one sensor 20, such as, but not limited to, a discharge air temperature (DAT) sensor, an outdoor temperature (ODT) sensor, a return air temperature (RAT) sensor, and/or an outdoor air quality sensor. In addition, the ECM 12 may be in communication with an IAQ system 22. Further, the ECM 12 may be in communication with at least one secondary user interface or "UI" 24. While FIG. 1 depicts the ECM 12 in wired communication with the above-mentioned elements, it is contemplated that in various embodiments the ECM 12 may be in wireless communication with one or more of the above-mentioned elements. The ECM 12, according to an exemplary embodiment of the disclosure, will be further shown in FIG. 2. The environmental conditioning system may have any number "x" of zones, where x is 2 or more. In a representative embodiment of the disclosure, the environmental conditioning system 10 is set up for three (3) zones and may include three (3) zone dampers or other controlled device(s) 18a, 18b, and 18c. That is, the typical system 10 includes at least one zone damper or other controlled device 18 for each zone. As stated above, each controlled device 18 is in communication, whether it be wired and/or wireless, with the ECM 12. In turn, each controlled device 18 is configured to receive a control signal or command from the ECM 12 via the wired and/or wireless communication. Similarly, the above described HVAC system 16 and IAQ system 22 of the environmental control system 15 are also configured to receive a control signal or command from the ECM 12 via the wired and/or wireless communication.

As shown in FIG. 1, the environmental conditioning system 10 includes a primary UI 14 and at least one secondary UI 24. The primary UI 14 may be disposed within or otherwise associated with a first zone ("zone 1") controlled by controlled device(s) 18a, while the secondary UIs 24a and 24b are disposed within the second and third zones ("zone 2" and "zone 3") controlled by controlled device(s) 18b and 18c, respectively.

The primary UI 14 includes at least one sensor 26, control logic 28, and a wi-fi module 30, the operation and benefits of which will be described later. The at least one sensor 26 is disposed within or otherwise associated with the first zone. For example, the sensor 26 may be disposed within the primary UI 14, if the primary UI 14 is positioned in zone 1. In other embodiments of the disclosure, the sensor 26 may be located external to and in wired or wireless communication with the primary UI 14. While the representative embodiment of the disclosure depicts a single sensor 26, such as a temperature sensor, other embodiments of the disclosure may include a number of sensors 26, such as a temperature sensor, and IAQ sensor, etc. In such embodiments of the disclosure, the sensors 26 may be all located within the primary UI 14, all external to and in communication with the primary UI 14, or any combination of internal and external to the primary UI 14. Within the primary UI 14, a signal received from the at least one sensor 26 is communicated to the control logic 28. Additional features of the primary UI 14 will be described with respect to FIG. 4.

Similarly, each secondary UI 24a, 24b, etc. includes at least one sensor 32. The at least one sensor 32 may be disposed within the secondary UI or be located external to the secondary UI. While the representative embodiment of the disclosure illustrates a single sensor 32, such as a temperature sensor, it is also contemplated that other embodiments of the disclosure may include a number of sensors 32, such as a temperature sensor, an IAQ sensor, etc. In these embodiments of the disclosure, the sensors 32 associated with each secondary UA 24a or 24b may all be internally located within the secondary UI, all externally located to the secondary UI, or any combination of the above. A signal received from the sensor 32 of a secondary UI 24a or 24b is communicated to the control logic 28 of the primary UI 14. As shown in FIG. 1, each secondary UI 24a or 24b may be in wired communication with the primary UI 14 by way of a junction within the ECM 12, in direct wireless communication with the primary UI 14, or both. It should be noted that wired communications through the ECM 12 are not transmitted directly to any of the controlled devices 18a-18c. They instead are communicated only with the primary UI. As such, an internal sensor 32 of the secondary UI 24 may send the signal to the control logic 28 by way of a wired communication through the ECM 12 or directly to the primary UI 14 by way of a wireless communication. In embodiments of the disclosure having an external sensor 32, the external sensor 32 may send the signal directly to the primary UI 14 by way of wireless communication. Additional elements of each secondary UI 24 will be described with respect to FIG. 5.

The control logic 28 disposed within the primary UI 14 is the main processing power of the system 10. The control logic 28 may include a number of memories (e.g., RAM, ROM, etc.) and microprocessors for receiving information from the sensors 26, 32, comparing the received information with setpoints, as described below to determine whether the received information meets or is within an acceptable range of the setpoints, and transmitting that determination to the ECM 12. This permits the ECM 12 to have minimal processing power, meaning only that which is required receive the determination from the control logic 28 of the primary UI 14 and then control the environmental control system 15 and the controlled devices 18 accordingly. It should also be noted that the secondary UIs 24 may also include microprocessors with minimal processing power in order to transmit information to the control logic 28 of the primary UI 14.

As shown in FIG. 1, one or more of the sensors 20 described above may be wirelessly connected to the primary UI 14 as either an alternative or in addition to the wired connection with the ECM 12. As a result, the data from the sensors 20 may be supplied to the control logic 28 of the primary UI 14 without passing through ECM 12. Additionally, one or more web-based sensor(s) 21 may be in direct wireless communication with the primary UI 14 to provide data regarding weather, pollen, temperature, etc. to the control logic 28 of the primary UI 14. In addition, one or more other system sensor(s) 23 such as, but not limited to, occupancy sensors, smoke detectors, and security system sensors may also be connected to or in communication with the system 10 in order to further monitor the zones and provide additional data to the control logic 28 of the primary UI 14. In varying embodiments of the disclosure, the other system sensors 23 may be wirelessly connected to the primary UI 14 and/or wired to the ECM 12 in order to communicate with the primary UI 14.

A user may also want to include one or more separate IAQ device(s) 25, such as, but not limited to, air cleaners, humidifiers, and dehumidifiers, within certain zones of the system 10. The separate IAQ devices 25 may be portable. In turn, these IAQ device(s) 25 may be in communication with the primary UI 14, either wirelessly or in wired communication through the ECM 12. As such, if an IAQ device 25 includes any sensors, the data from the sensors of the IAQ device 25 can be communicated to the primary UI 14 and its control logic 28, either directly or through the ECM 12. In turn, the primary UI 14 is capable of controlling operation of the IAQ device(s) 25.

Figure 2:
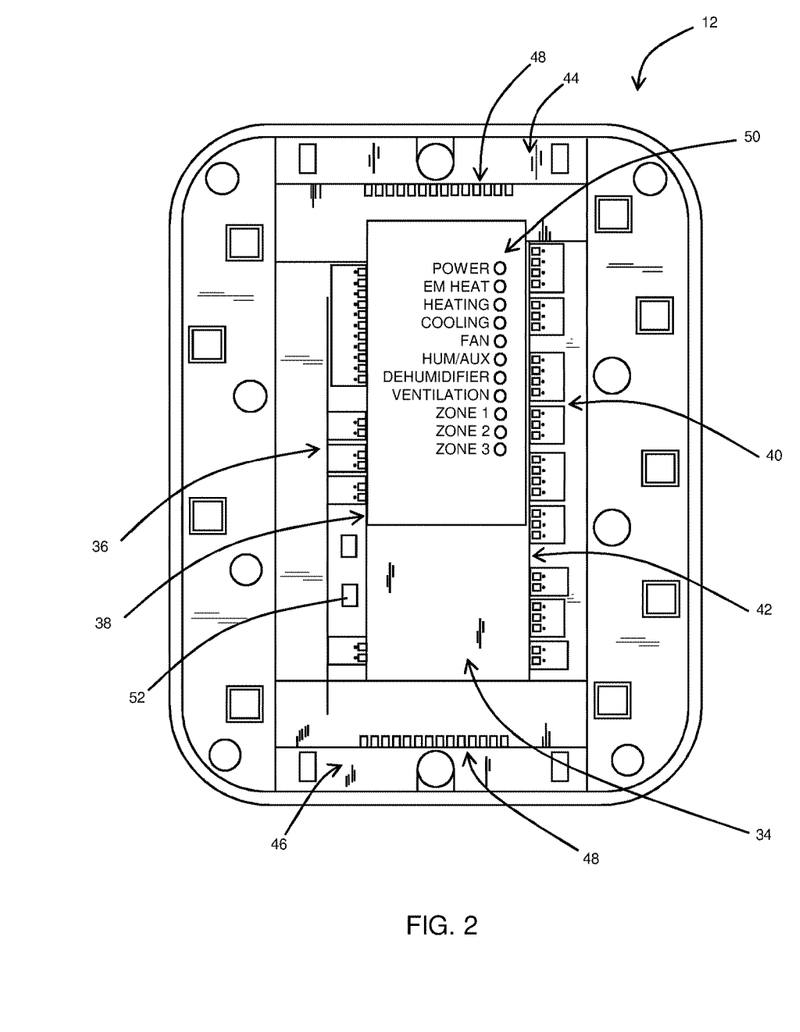
FIG. 2 is a front view of an electronic control module of the multi-zone environmental control system of FIG. 1, according to an embodiment of the disclosure.

Next, FIG. 2 depicts the ECM 12 with a cover removed, according to a non-limiting embodiment of the disclosure. The ECM 12 includes a central portion 34, a first set of connection terminals 36 disposed to a first side 38 of the central portion 34, and a second set of connection terminals 40 disposed on a second side 42 of the central portion 34. As shown in FIG. 2, the second side 42 of the central portion 34 may be disposed opposite the first side 38 of the central portion 34. In addition, an upper side 44 and a lower side 46 of the central portion 34 may include ventilation openings 48 formed therein to provide air flow to a circuit board disposed behind the central portion 34 of the ECM 12. The central portion 34 may also include an information display 50. As shown in FIG. 2, the information display 50 may include a plurality of indicators such as LED lights, each light indicating the status of an element of the system 10.

As described above, each element of the environmental conditioning system 10 may be wired to the ECM 12 via connection terminals 36 or 42. Wired connections internal to the ECM 12 may be a RS-485 communication bus or the like. In the representative embodiment of the disclosure, the first set of connection terminals 36 may be used to connect the ECM 12 to at least one of the HVAC system 16, the additional or system sensors 20, and a power source. Meanwhile, the second set of connection terminals 40 may be used to connect the ECM 12 to at least one of the primary UI 14, secondary UIs 24a and 24b, zone dampers 18, and IAQ system 22. Additionally, a manual test button 52 may be disposed on the first side 38 of the central portion 34 to allow an installer or user to run a diagnostic test of the system 10. Notably, the central portion 34 lacks any other touch screens, buttons, switches, or other user inputs.

Figure 3:
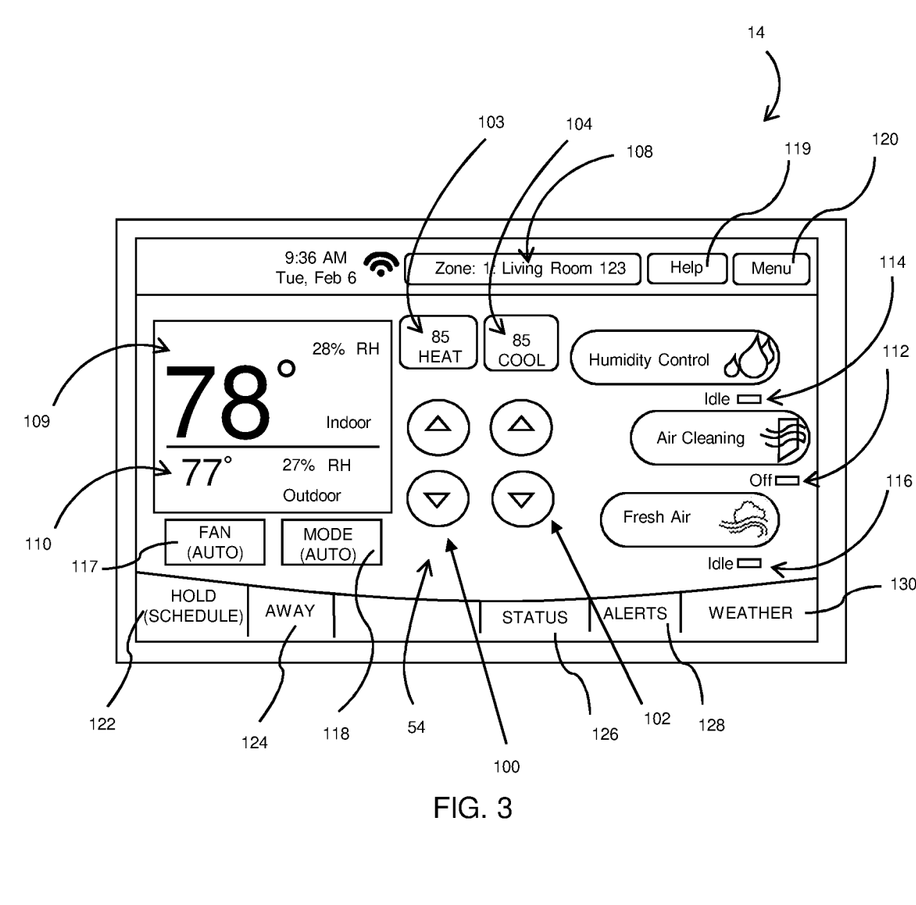
FIG. 3 is a front view of a primary user interface of the multi-zone environmental control system of FIG. 1, according to an embodiment of the disclosure.

As shown in FIG. 3, the primary UI 14 may have a single display screen 54 configured to display information to the user regarding operation of the entire environmental conditioning system 10 and/or environmental conditions. For instance, the primary UI 14 may display the time, date, interior (e.g., within a structure including all or part of system 10) temperature of the first zone, exterior (e.g., outside a structure including all or part of system 10) temperature, interior humidity of the first zone, exterior humidity, and the operating mode of the system (e.g., heating or cooling). The display 54 of the primary UI 14 may be configured as a touch screen that receives input from a user. A temperature setpoint, shown in locations 103 and 104, may be adjusted via selection of (e.g., touching, depressing) arrows 100 and/or 102. For instance, a user may adjust the temperature setpoint of the first zone of the system 10 using arrows 100 and 102, which may be used to trigger activation of the HVAC system 16 and first zone damper. In a cooling mode, the system will cool to the setpoint. In a heating mode, the system will heat to the setpoint. These setpoints may be set by the user using arrows 100 and 102. In various embodiments, the temperature setpoints for heating and cooling (shown in locations 103 and 104 on display 54) may correspond to the same temperature setpoints or different temperature setpoints for each, respectively.

The primary UI 14 may display information relating to other zones within the plurality of zones in response to selection (e.g. touching, depressing) of specific locations on display screen 54 by a user. While the default display of the primary UI 14 may include information regarding the first zone, such as interior temperature shown in location 109, the user may adjust the primary UI 14 so that it displays information regarding the other zones of the system 10. This alternate display may be accessed via an input 108 on the display screen 54. In addition, a user is able to adjust the temperature setpoint of the remaining zones of the system 10, which may be used to trigger activation of the HVAC system 16 and the respective dampers 18. As described above, the system 10 may heat or cool to this temperature setpoint, wherein the setpoint may be an upper or lower temperature limit depending on whether the system 10 is in a cooling mode or a heating mode, respectively. Also, as mentioned above, separate setpoints could be set for heating and cooling using the arrows 100 and 102.

As stated above, the primary UI 14 may be configured to display the exterior temperature. The exterior temperature may be sensed by one of the previously described sensors 20, such as an ODT sensor. A signal received from the sensor 20 that is indicative of the exterior temperature may then be sent to the primary UI 14 either through a direct wireless connection or the previously described wired connection shown in FIG. 1. In turn, the primary UI 14 may then display the sensed exterior temperature at location 110. In embodiments of the disclosure that do not include a sensor 20 for sensing the exterior temperature, the wi-fi module 30 of the primary UI 14 may be used to connect and retrieve local weather data from a third-party source such as the National Weather Service. In turn, the retrieved weather data may be displayed on the primary UI 14.

Other displayed information shown in FIG. 3 includes time, date, and wi-fi connection. As stated above, the user may change which zone information is displayed on the primary UI 14 using input 108. As such, the primary UI 14 can be controlled to display zone information regarding any desired zone by scrolling through.

Other displayed information on primary UI 14 includes the operating status of the IAQ system 22. For example, whether a humidifier or dehumidifier is active or idle may be displayed in location 112, whether IAQ system 22 is actively cleaning the air may be displayed in location 114, or whether the IAQ system 22 is providing fresh air may be displayed in location 116. In addition to displaying the operational status of the IAQ system 22, it is contemplated that in various embodiments a user may provide an input to the primary UI 14 by touching the displayed operating status of the IAQ system 22. The operating status of IAQ system 22 may be accessed or changed via selection of (e.g., touching, depressing) locations 112, 114, and/or 116, which are located on display 54. For instance, a user may activate or deactivate a humidifier or dehumidifier by touching the display 54 at location 112, the user may turn on or turn off the air cleaning operation of the IAQ system 22 by touching location 114, or the user may turn on or turn off the fresh air operation of the IAQ system 22 by touching location 116. In addition, the primary UI 14 may display a status of the fan of the HVAC system 16 at location 117. For example, the fan status may be on, off, or auto. As shown in FIG. 3, the user may also provide an input by touching the fan status at location 117 to change the status between on, off, and auto. Additionally, the primary UI 14 may provide a mode input at location 118 to allow a user to change the operation of the environmental control system 15 (e.g., via touching or depressing location 118) among off, a heating mode that only operates to maintain the temperature at or above the setpoint, a cooling mode that only operates to maintain the temperature at or below the setpoint, or an automatic mode that determines whether to either heat or cool the zones in order to maintain the temperature at the setpoint.

FIG. 3 further illustrates a number of other user inputs in the primary UI 14. For instance, help and menu inputs are provided at location 119 and location 120 (e.g. via touching or depressing locations 119 and/or 120). Upon selection of these inputs 119 or 120 by the user by interaction with the touch screen 54, the primary UI 14 may change its display 54 to show a help screen or menu screen, accordingly. Similarly, the primary UI 14 may include a schedule input at location 122 that results in the primary UI 14 changing its display 54 to show a schedule screen (in response to selection of location 122), which allows a user to input (via interaction with display 54) and revise a schedule for the environmental conditioning system 10. An away input at location 124 (e.g., selecting or depressing location 124) may result in the system 10 going into an away mode. A status input at location 126 (e.g., selecting or depressing location 126) may result in the primary UI 14 changing its display 54 to show a status screen, which displays the status of each piece of HVAC system 16 and IAQ system 22. This status screen on display 54 allows a user to view and manipulate the status of each piece of HVAC system 16 and IAQ system 22. In various embodiments, the status corresponding to each piece of HVAC system 16 may include, but is not limited to, an indication that the particular piece is on, off, active, running, idle, malfunctioning, operating according to a preset mode, etc. An alerts input at location 128 may result in the primary UI 14 changing its display 54 to show an alerts screen that displays alerts generated by system 10. This alerts screen allows a user to view and manipulate a number of alerts generating by the system 10. In various embodiments, the alerts may include, but are not limited to, notifications related to system 10 operation, service indicators, maintenance indicators, and/or fault indicators. Additionally, a weather input at location 130 may result in the primary UI 14 changing its display 54 to show a weather screen that displays current and future weather conditions, wherein the weather information may be obtained from a third-party source (e.g., the National Weather Service). This weather screen allows a user to view current and future weather conditions.

As described above, the primary UI 14 may include an away input at location 124 that allows a user to place the system 10 in an away mode in which the setpoints, such as a desired temperature or humidity, are changed to predesignated setpoints. The setpoints corresponding to an away mode may be predetermined by the user. These away mode setpoints, which may correspond to higher/lower temperature setpoints and/or higher/lower humidity setpoints maintained by system 10 relative to when not in an away mode, are maintained by system 10 and typically provide a lower comfort level than would typically be utilized if the user were present. For example, the setpoint temperature for heating when system 10 is in an away mode may be substantially below the typical setpoint would otherwise be for an occupied space (e.g., system 10 would not be in an away mode). Upon the user selecting the away mode on the primary UI 14 (via selection of location 124 on display 54), the entire system 10 may be placed in an away mode and the setpoints of each zone are changed to the away setpoints. Alternatively, upon the user selecting the away mode on the primary UI 14, the primary UI 14 may request the user to identify which zones to put in the away mode.

While FIG. 3 depicts an exemplary layout of the display and input elements of the primary UI 14, other embodiments of the disclosure may include the same display and input elements arranged in any number of orders. In addition, it is contemplated that in various embodiments a primary UI 14 need not include all of the display and input elements described above. Likewise, primary UIs 14 of other embodiments of the disclosure may include more display and input elements than those described above. User input also could be provided via buttons, switches, or other devices instead of or in addition to the touchscreen 56.

Figure 4:
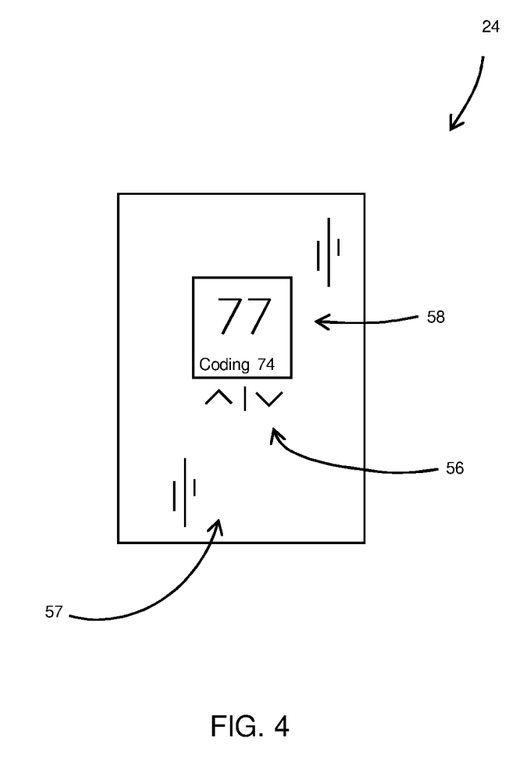
FIG. 4 is a front view of a secondary user interface of the multi-zone environmental control system of FIG. 1, according to an embodiment of the disclosure.

As shown in FIG. 4, each secondary UI 24 is configured to display information to a user. For instance, the secondary UIs 24a and 24b may display the interior temperature of each respective zone 2 or zone 3, the operating mode of the environmental conditioning system 10 (e.g., heating or cooling), and the setpoint temperature of each respective zone 2 or zone 3 associated with the operating mode. In addition, each secondary UI 24a and 24b is configured to receive inputs from the user for adjusting a set point such as a setpoint temperature in the respective zone in which the secondary UI is located. The system 10 will cool to this setpoint temperature in cooling mode and heat to the setpoint temperature in cooling mode. Other environmental setpoints, such as humidity or air quality limits also could be set. In various embodiments, environmental setpoints may be set via UIs 24, by another interface within system 10, or a combination thereof.

In a representative embodiment of the disclosure, a user may adjust the temperature or air quality setpoint of the zone associated with a given secondary UI 24 via an input 56 on a touchscreen 57 disposed below and adjacent to a display 58 on the secondary UI 24. In various embodiments, a capacitive touch board may be disposed underneath the touch screen 57 to receive the inputs from the user. The display 58 may be a simple illuminated display that is separate from the touchscreen 57 or may be a touch screen and include the input 56. FIG. 4 further illustrates the input 56 as including an up arrow and a down arrow that may be selected (e.g., via touching or depressing). It is also contemplated that the input 56 may be mechanical buttons or incorporated within the display 58 itself. In any event, the secondary UI 24a or 24b displays the adjustment to the temperature setpoint on the display 58 and communicates the adjustment of the temperature setpoint to the primary UI 14, which then sends control signals to the ECM 12, which controls the controlled devices of zone 2 or zone 3 associated with the respective secondary UI 24. As such, the primary UI 14 may receive inputs from the secondary UIs 24.

During system installation, the environmental conditioning system 10 may be configured to automatically detect the number of controlled zones by determining the number of controlled devices 18 and UIs 14, 24 that have been connected to the ECM 12, such as correct wired connections through connection terminal 40, or via wireless connections. That is, in various embodiments, once a controlled device 18 and UI have been correctly wired to the ECM 12 at a connection terminal 40, the ECM 12 is able to communicate the positive connection to the control logic 28, which then counts the number of controlled devices 18 and UIs 14, 24 that have been connected to the ECM 12 either through wired (e.g., via terminals 36 and 40) or wireless connections. In turn, the control logic 28 may use the number of controlled devices 18 and UIs 14, 24 installed to determine the number of zones in the system 10. For example, if three (3) devices 18, one (1) primary UI 14, and two (2) secondary UIs 24 have been correctly installed, the control logic 28 is able to determine that it is a three-zone system. In turn, the primary UI 14 may query, on the display 54, whether the correct number of zones have been counted by the control logic 28. Upon confirmation, the installation process may continue. However, if the number of zones indicated by the primary UI 14 is incorrect, the installer or user is instructed to check and correct the connections of the controlled device devices 18 and the UIs 14, 24. Further, once all the elements of the system 10 have been connected via wired or wireless communications, the installer may user the primary UI 14 to setup and configure every element of the system 10.

Figure 5:
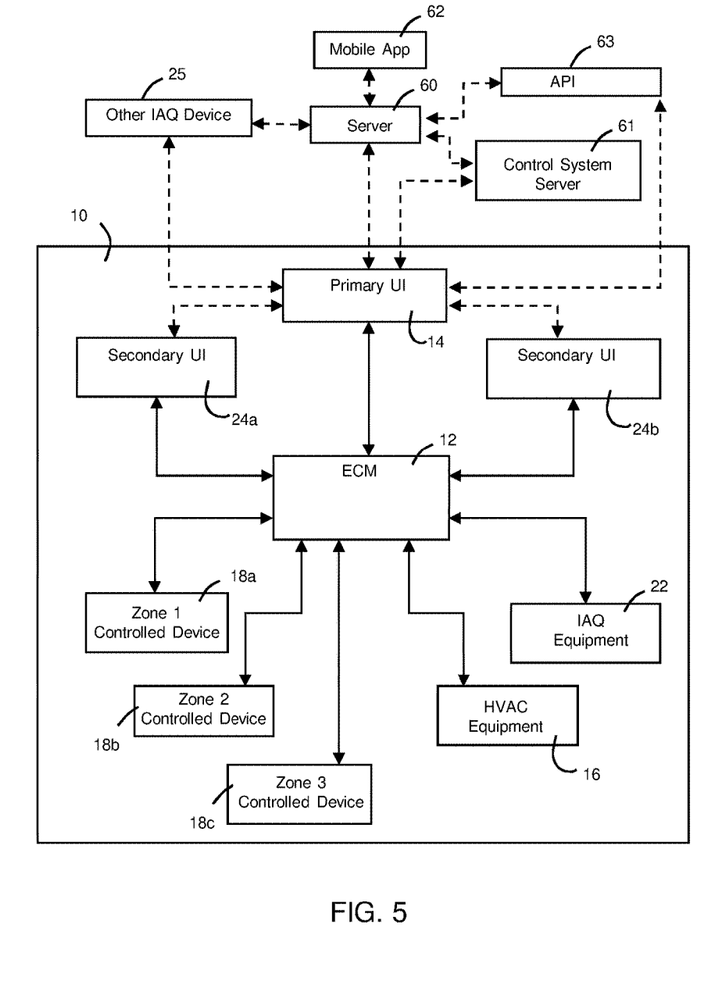
FIG. 5 is a schematic diagram of the multi-zone environmental control system of FIG. 1 and an external communication network.

Referring next to FIG. 5, the connectivity of the environmental conditioning system 10 with an external server 60 is shown. A user may access the external server 60 through a mobile application 62 on a computing device, such as, but not limited to, a cellular phone, a tablet, or a laptop. A shown in FIG. 2, the external server 60 is in communication with the system 10 by way of the primary UI 14. For example, the previously described wi-fi module 30 of the primary UI 14 allows the primary UI 14 to wireless communicate with the external server 60. As a result, inputs by the user in the mobile application 62 are communicated to the external server 60 and then to the primary UI 14. User inputs relating to zones 2 and 3, may be communicated through the primary UI 14 and to the respective secondary UIs 24 via the previously described wired or wireless communications. That is, the primary UI 14 may receive inputs from the mobile application 62.

Conversely, the primary UI 14 is able to transmit data to the external server 60 regarding the current operating status of elements within the system 10. In turn, a user is able to access the external server 60 through the mobile application 62 and view the current operating statuses of the elements of the system 10. In addition, the user may view the current temperature and air quality limits of each of the zones.

In addition, at least one other system server 61 may be provided that is able to communicate with the primary UI 14. As shown in FIG. 5, the other system server 61 may be in communication with the primary UI 14 directly and/or via the external server 60 and/or a web-based service (e.g., the cloud). For example, the other system server 61 may include a security system server for a security system for the zones of the system 10. Instead of or in addition to this arrangement, the other system server 61 may include a home automation server for controlling a home automation system (e.g., Internet of Things platforms, virtual assistants, etc.). As a result, the system 10 and, more specifically, the control logic 28 of the primary UI 14, is able to receive data from the other systems that monitor the zones via the other system servers 61 and may interface with the primary UI 14 to control one or more of the devices 18 and/or to generate warnings and/or to control other systems beyond those shown in the drawings, such as lighting systems. Instead of or in addition to a home automation sever, the other system server 61 could be a utility server that transmits response commands for energy management. In various embodiments, components of system 10 (e.g., HVAC system 16 components, IAQ system 22 components, etc.), may activate or deactivate based on information, such as a response command, received from a utility server. Received information may include, but is not limited to, energy consumption rates, energy costs, outages (e.g., brown outs), reductions in energy availability, advisories or commands for energy consumption setbacks, etc. In various embodiments, activation or deactivation based on received information may be further based on decisions determined automatically by system 10, from input from a user, or a combination thereof. In various other embodiments, system 10 may generate notifications based on received information. These notifications may be provided by system 10 preemptively, simultaneously, and/or subsequently to deactivation or activation of system 10 components. The system 10 may use the server 61 as opposed to or in conjunction with the above described other system sensors 23.

The primary UI 14 may also be connected to an open application programming interface (API) 63, such as a weather data provider. It is contemplated that in various embodiments the API 63 may communicate directly with the primary UI 14 or via the external server 60. As a result, the primary UI 14 may connect and retrieve weather data, as previously discussed. In turn, the control logic 28 of the primary UI 14 may utilize the weather data. The system 10 may use the server 62 as opposed to or in conjunction with the above described web-based sensors 21.

FIG. 5 further depicts the previously discussed portable IAQ devices 25. As shown, the portable IAQ device 25 may be in direct wireless communication with the primary UI 14 or in wireless communication with the primary UI 14 by way of the external server 60.

Figure 6:
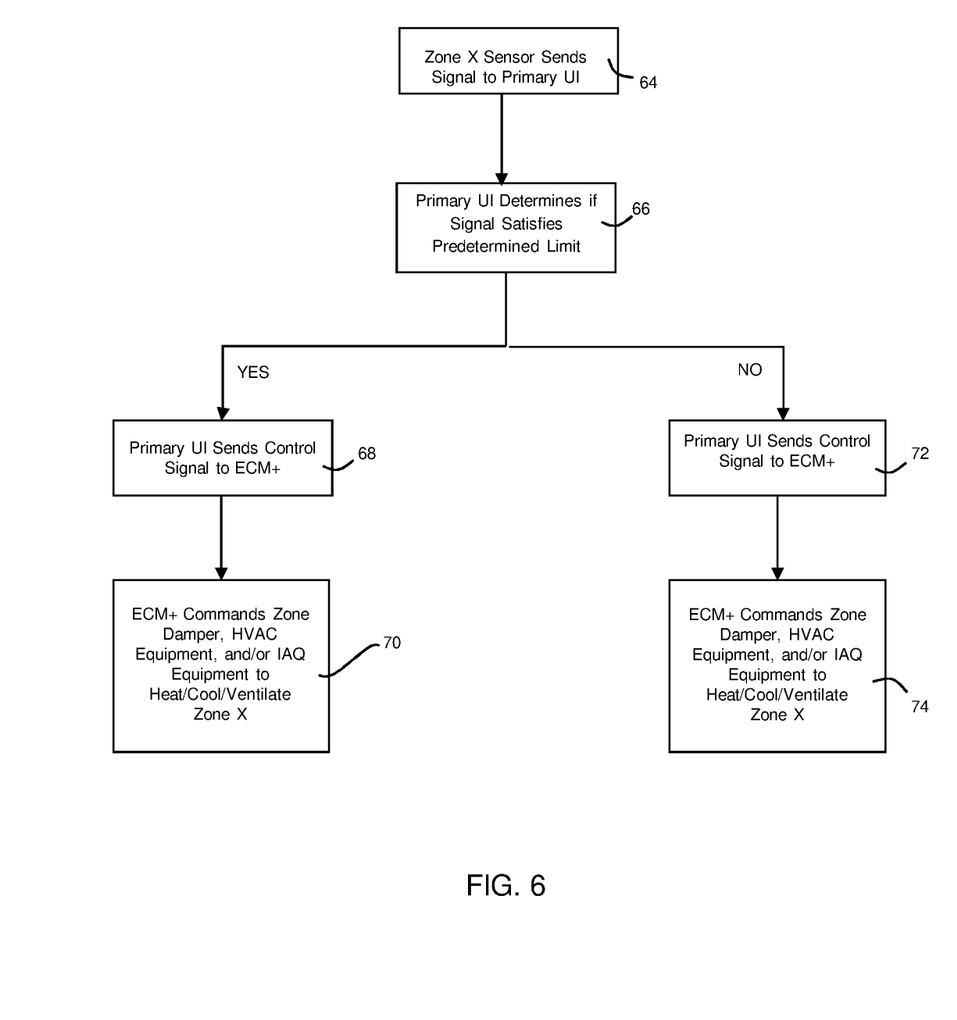
FIG. 6 is a flow diagram showing an illustrative method that may be carried out by the multi-zone environmental control system.

Next, FIG. 6 depicts a flow diagram illustrating the operation of the environmental conditioning system 10 as the sensor 26 of the primary UI 14 and the sensors 32 of the secondary UI 24 provide signals to the control logic 28 of the primary UI 14. The system 10 includes connected zones 1, 2, . . . n containing sensors 32*a, b, . . .* n, which each correspond to UIs 24*a, b, . . .* n, wherein n corresponds to the total number of connected zones In step 64, the sensor 26 of the primary UI 14 in the first zone, the sensor 32*a* of the secondary UI 24*a* of the second zone, the sensor 32*b* of the secondary UI 24*b* of the third zone, or the sensor 32*n* of the secondary UI 24*n* of the nth zone sends a signal indicative of an environmental condition such temperature or air quality within its respective zone. In step 68, the control logic 28 of the primary UI 14 determines whether the sensed environmental condition, or an environmental condition dependent upon that environmental condition, meets a predetermined criterion or setpoint. As discussed above, the predetermined criterion or setpoint may be chosen by the user and adjusted during operation of the system 10. If the criterion is satisfied, the process cycles to step 64 without activating the controlled devices. If the criterion is not satisfied, the primary UI 14 sends a control single to the ECM 18 at step 70, which then transmits a control signal to the controlled device(s) associated with the zone of interest at step 72. The process then cycles back to step 64, and the process continues until the criterion is satisfied, whereupon the controlled device(s) will be deactivated.

For example, when HVAC system 16 of the system 10 is in a heating mode, the control logic 28 determines at step 64 whether the received temperature measurement from a zone x is within a predetermined range (where x is a zone among connected zones 1, 2, . . . n), typically within one or two degrees of a setpoint temperature as input at either the secondary UI 24*x* associated with that zone or the primary UI 14. If so, then no action need be taken, and the process cycles back to step 64. If not, a signal is sent to the ECM 12 in step 70, and the ECM 12 controls the HVAC system 16 and/or the respective zone damper 18 to begin, terminate, increase, or decrease hot air supply to that zone in step 72. The controlled devices will be activated until the setpoint temperature is reached. In another example, the control logic 28 determines in step 68 whether the measured air quality, such as a humidity, from a zone "x" is within a desired range of a value specified by a user using either the secondary user interface 18*x* associated with that zone or the primary user interface 14. If the measured air quality is within the desired range, then no action needs to be taken, and the process cycles back to step 64. If the measured air quality is outside of the desired range air quality measurement is below the user determined lower limit, a signal is sent to the ECM 12, and the ECM 12 controls the IAQ system 22 and the controlled device(s), such zone dampers 18*x*, associated with that zone to condition the zone. The process then cycles back to step 64.

Figure 7:
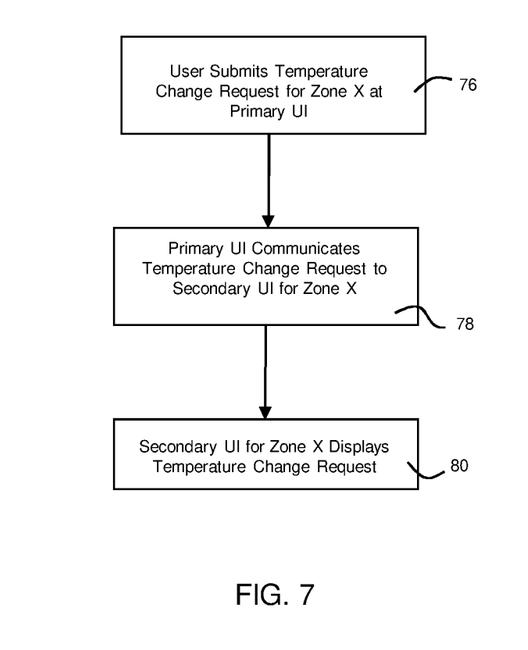
FIG. 7 is a flow diagram showing an illustrative method that may be carried out by the multi-zone environmental control system.

FIG. 7 depicts a flow diagram illustrating a specific example of operation of the environmental conditioning system 10 in response to user inputs received by the primary UI 14. That example is temperature control in FIG. 7. As stated above, a user may interact with the primary UI 14 to adjust the setpoint temperature of the first zone (zone 1) and any of the other zones 2, 3, . . . n. In step 76, a user interacts with the primary UI 14 to adjust the setpoint temperature of at least one of the second zone, third zone, and other remaining zones. In the step 78, the primary UI 14 communicates with the secondary UI 24 of the specific zone (for example, secondary UI 24a associated with zone 2) in which the user has adjusted the temperature setpoint. In step 80, the secondary UI 24 receives the information from the primary UI 14 and then is able to display the adjusted setpoint temperature. In addition, the control logic 28 uses the adjusted setpoint temperature to generate the control signals sent to the ECM 12, which then controls the controlled device(s) 18 in the zone of interest as described above in conjunction with FIG. 6.

As previously described, it is also possible for a user to adjust the air quality setpoint of zone 1 and any of the other zones using the primary UI 14. The flow diagram illustrated in FIG. 7 may also be instituted with respect to a user interacting with the primary UI 14 to adjust the air quality setpoint of at least one of zone 2, zone 3, and any other remaining zones. The controlled parameter is simply an air quality parameter such as humidity rather than temperature.

Figure 8:
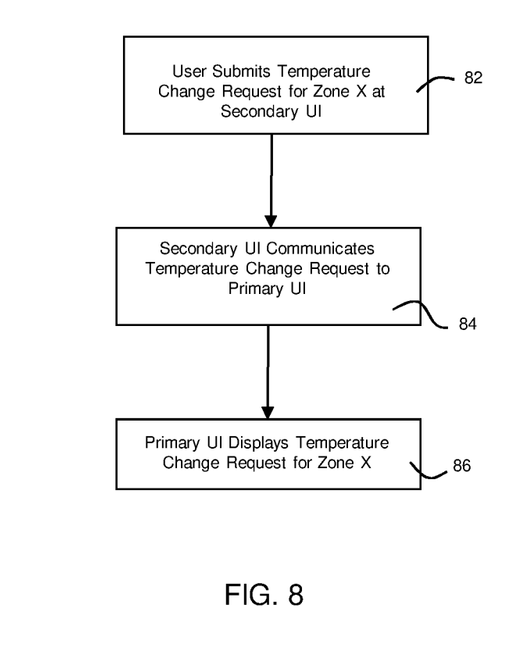
FIG. 8 is a flow diagram showing an illustrative method that may be carried out by the multi-zone environmental control system.

FIG. 8 depicts a flow diagram illustrating operation of the environmental conditioning system 10 in response to user inputs received by one of the secondary UIs 24x, corresponding to a zone x. As stated above, a user may interact with the secondary UI 24x associated with a given zone x to adjust a setpoint environmental condition within zone x. In the illustrative example of an HVAC system 16 operating in heating mode, that setpoint condition is air temperature, as shown in step 82. In turn, the secondary UI 24 may display the adjusted setpoint temperature. In step 84, the secondary UI 24 transmits a signal indicative of the adjusted temperature setpoint to the primary UI 14. In step 86, the primary UI 14 is then able to display the adjusted temperature setpoint for the corresponding zone x. In addition, the control logic 28 of the primary UI 14 may then use the adjusted temperature setpoint for the zone of the secondary UI 24x to determine if the signals received from the temperature sensor of the secondary UI 24x are within a designated range of the setpoint temperature and, if not, controls the controlled device(s) 18x associated with zone x using the process described above in conjunction with FIG. 6.

The same is applicable to an air quality setpoint of a given zone x. That is, a user may interact with the secondary UI 24x associated with a zone x to adjust the air quality setpoint, such as desired humidity, in that zone. In turn, the secondary UI 24 may display the adjusted air quality setpoint and communicate the adjusted air quality setpoint to the primary UI 14. The primary UI 14 may also display the adjusted air quality setpoint of the respective zone. Further, the control logic 28 of the primary UI 14 may then control the air quality in zone x using the process described above in conjunction with FIG. 6. It is also contemplated that some or all the zones may have a single shared air quality set point, such as desired humidity. In turn, the control logic 28 of the primary UI 14 may then control the air quality in each zone using the process shown in FIG. 6.

As discussed above, the primary UI 14 may include a weather input at location 130 that causes the primary UI 14 to display current and predicted weather conditions for the user's information. In addition, the environmental conditioning system 10 may use the data received regarding current and projected weather conditions to control operation of the system 10. For example, and as described above, the current weather conditions may be used in place of sensors measuring outdoor conditions, such as temperature and air quality. In another example, the system 10 could use predicted future weather conditions to control the controlled devices 18, the HVAC system 16, and/or the IAQ system 22 in anticipation of future weather events. For instance, extra cooling could be sent to at least one zone in anticipation of a sunny and warm day. As another example, ambient air intake could be curtailed or prevented in the event of actual or projected poor air quality.

In yet another embodiment of the disclosure, the environmental conditioning system 10 may be able to average the temperatures of two or more zones. As described above, the sensor 32 of each secondary UI 24 may be a temperature sensor and configured to communicate with the primary UI 14. In particular, the sensed temperature of each zone having a secondary UI 24 may be supplied to the control logic 28 of the primary UI 14. In addition, the sensor 26 within the primary UI 14 may sense the temperature within the first zone. As a result, the control logic 28 of the primary UI 14 may average together the sensed temperature of some or all of the controlled zones and provide an average system temperature. In this instance, the user may establish, via the primary UI 14, a single setpoint temperature for all the zones. The control logic 28 of the primary UI 14 would determine whether the average system temperature satisfies the single setpoint temperature and send a signal to the ECM 12 indicative of the determination. If the average system temperature does not satisfy the single setpoint temperature to within a designated range, the ECM 12 controls the zone dampers 18 and the HVAC system 16 to achieve the desired average setpoint temperature as described above in connection with FIG. 6. Similarly, the system 10 may be able to base control on an average the air quality of the controlled zones.

The environmental conditioning system 10 may also be configured to determine the total run time of the elements of the environmental conditioning system 10 over a predetermined period of time. For example, the total run time of the HVAC system 16 could be tracked by the control logic 28 of the primary UI 14. For example, the control logic 28 is able to track that the HVAC system 16 has been run for a total of 15 minutes over a 60-minute period. The total run time is the summation of the time that the ECM 12 has controlled the HVAC system 16 to run based on determinations of all the zones. For instance, if the first zone required 5 minutes of heating, the second zone required 0 minutes of heating, and the third zone required 10 minutes of heating, the total run time of the HVAC system 16 would be 15 minutes.

Further, a user or installer may set up, via the primary UI 14, a lower limit for the amount of time that the HVAC system 16 or the IAQ system 22 may run over the predetermined period of time. For example, the user or installer may set the lower limit to require the HVAC system 16 to run at least 20 minutes over a 60-minute period. In turn, if total run time of the HVAC system 16 is below the lower limit, the control logic 28 may send a signal to the ECM 12 indicative thereof. For instance, if the HVAC system 16 has only run 15 minutes over a 60-minute period and the lower limit is 20 minutes of the 60-minute period, the control logic 28 may send a signal to the ECM 12 that the HVAC system 16 needs to run for an additional 5 minutes. In turn, the ECM 12 controls the HVAC system 16 to activate for a period of time to satisfy the lower limit. As a result, air cleaning and ventilation requirements can be met by the sum of zones calling over the hour.

In another embodiment of the disclosure, the user may prioritize one zone of another zone. For instance, via the primary UI 14, the user may order the zones 1, 2, . . . x of the system 10 in order from most important to least important or vice versa. In turn, the system 10 might respond quicker to calls for heating, cooling, humidifying, dehumidifying, etc. for zones that are of more importance to the user. It is also contemplated that the user may input a priority schedule into the primary UI 14 in order to prioritize certain zones at certain points of the day. For instance, zones including the kitchen and family room may receive the highest priority in the late afternoon and early evening, while zones including the bedrooms may receive the highest priority in the late evening and early morning. In embodiments of the system using temperature averaging, higher priority zones may be given more weight in determining the total average system temperature. That is, the sensed temperatures of the higher priority zones may be given more weight than the sensed temperatures of lower priority zones.

In another embodiment of the disclosure, the system 10 may prioritize calls for heating, cooling, humidifying, dehumidifying, air cleaning, and ventilation. For example, heating and cooling may be given highest priority, while ventilation is given the next highest priority, air cleaning is given the next highest priority, and humidifying and dehumidifying are given the lowest priority. In such an example, if zone 1 called for heating and zone 3 called for humidifying, zone 1 would be heated before the air in zone 3 was humidified. It is also contemplated in the above example that if zone 2 would call for ventilation before the heating of zone 1 was complete, the ventilation of zone 2 would be prioritized over humidifying zone 3. In other embodiments of the disclosure, the calls may be prioritized in any order. It is also contemplated that a user or installer may select the priority.

In yet another embodiment of the disclosure, the environmental conditioning system 10 may predict the needs of a particular zone or zones based upon a determination that another zone or zones requires use of the HVAC system 16 and/or IAQ system 22 and may act preemptively. For instance, in a heating mode, if the control logic 28 of the primary UI 14 determines that the sensed temperature from the sensor 26 in the first zone is below the setpoint temperature, the primary UI 14 may send a signal to that effect to the ECM 12, and the ECM 12 may control the zone damper 18*a* and the HVAC system 16 to heat the first zone. Meanwhile, if the control logic 28 also determines that the sensed temperature from the sensor 32*b* in the third zone 18*c* is approaching the setpoint temperature and is about to drop below the setpoint temperature, the primary UI 14 may also send a signal to the ECM 12 indicative thereof, and the ECM 12 can then control the zone damper 18*c* and the HVAC system 16 to heat the third zone in order to avoid a subsequent call to activate the HVAC system 16. The above example is also applicable to a cooling mode and air quality determinations.

While the instant disclosure has been described above according to its preferred embodiments, it can be modified within the spirit and scope of this disclosure. This application is therefore intended to cover any variations, uses, or adaptations of the instant disclosure using the general principles disclosed herein. Further, the instant application is intended to cover such departures from the present disclosure as come within the known or customary practice in the art to which this disclosure pertains.

Notwithstanding the embodiments described above in FIGS. 1-8, various modifications and inclusions to those embodiments are contemplated and considered within the scope of the present disclosure. Any of the operations described herein can be implemented as computer-readable instructions stored on a non-transitory computer-readable medium such as a computer memory.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

Furthermore, functions and procedures described above may be performed by specialized equipment designed to perform the particular functions and procedures. The functions may also be performed by general—use equipment that executes commands related to the functions and procedures, or each function and procedure may be performed by a different piece of equipment with one piece of equipment serving as control or with a separate control device.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent Moreover, although the figures show a specific order of method operations, the order of the operations may differ from what is depicted. Also, two or more operations may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection operations, processing operations, comparison operations, and decision operations.

What is claimed is:

1. A system comprising:
    a control module configured to control a controlled device that controls an environmental condition;
    a primary user interface in communication with the control module and associated with a first zone, the primary user interface configured to:
        receive an input from a user regarding control of the first zone; and
        transmit a signal to the control module to control the controlled device; and
    a secondary user interface associated with a second zone, the secondary user interface configured to:
        receive an input from the user regarding control of the second zone;
        wherein the secondary user interface is in communication with the primary user interface such that the primary user interface transmits a first signal to the control module for controlling the controlled device and a second signal to the control module for controlling another controlled device associated with the second zone, the second signal being based on a predicted condition within the second zone, and wherein the control module comprises a zone control panel separate from the primary user interface and the secondary user interface;
        wherein the predicted condition within the second zone is based on a comparison by the primary user interface of the environmental condition in the first zone to an environmental setpoint corresponding to the first zone.

2. The system of claim 1, wherein the primary user interface is configured to receive information from a sensor configured to sense the environmental condition in the first zone;
    wherein the secondary user interface is configured to receive information from a sensor configured to sense the environmental condition in the second zone;
    wherein the environmental condition in the second zone is communicated to the primary user interface;
    wherein the primary user interface is configured to make a first determination of whether the environmental condition in the first zone is at or near a first setpoint and to make a second determination of whether the environmental condition in the second zone is at or near a second setpoint; and
    wherein the primary user interface transmits the first determination and the second determination to the control module.

3. The system of claim 2, wherein, when the primary user interface determines that the environmental condition in the first zone is not at or near the first setpoint, the control module controls the controlled device to activate, and wherein, when the primary user interface determines that the environmental condition in the second zone is not at or near the second setpoint, the control module controls the second controlled device to activate.

4. The system of claim 2, wherein, when the primary user interface determines that the environmental condition in the first zone satisfies the first setpoint, the control module controls the controlled device to deactivate, and wherein, when the primary user interface determines that the environmental condition in the second zone satisfies the second setpoint, the control module controls the second controlled device to deactivate.

5. The system of claim 1, wherein the primary user interface is configured to communicate with an external server.

6. The system of claim 5, wherein the primary user interface comprises a wi-fi module, wherein the wi-fi module is configured to communicate with the external server, and the external server is configured to communicate with a mobile application.

7. The system of claim 1, wherein the primary user interface is connected to an open application programming interface (API).

8. The system of claim 1, wherein the primary user interface transmits the signals to the control module based on a priority associated with a signal type.

9. The system of claim 1, wherein the primary user interface transmits the signals to the control module based on a priority associated with a zone.

10. The system of claim 1, wherein the control module comprises:
a central portion;
a first set of connection terminals disposed to a first side of the central portion;
a second set of connection terminals disposed to a second side of the central portion; and
an information display.

11. The system of claim 1, wherein the secondary user interface comprises:
a display, configured to display information to the user; and
an input disposed adjacent to the display.

12. A system comprising:
a control module configured to control a controlled device that controls an environmental condition;
a first user interface in communication with the control module and associated with a first zone, the first user interface configured to:
receive an input from a user regarding control of the first zone;
transmit a first signal to the control module to control the controlled device; and
transmit a second signal to the control module to control a second controlled device associated with a second zone, the second signal being based on a predicted temperature within the second zone, and wherein the control module comprises a zone control panel separate from the first user interface;
wherein the predicted temperature within the second zone is based on a comparison by the first user interface of a sensed temperature within the first zone to a temperature setpoint corresponding to the first zone;
a second user interface, wherein the second user interface is associated with the second zone, and wherein the second user interface is configured to receive an input from the user regarding control of the second zone;
wherein the zone control panel is separate from the second user interface.

13. The system of claim 12, wherein the first user interface is configured to receive information from a sensor configured to sense the environmental condition;
wherein the first user interface is configured to make a determination of whether the environmental condition is at or near a setpoint; and
wherein the first user interface transmits the determination to the control module.

14. The system of claim 13, wherein, when the first user interface determines that the environmental condition is not at or near the setpoint, the control module controls at least one of the controlled device or the second controlled device to activate.

15. The system of claim 13, wherein, when the first user interface determines that the environmental condition satisfies the setpoint, the control module controls at least one of the controlled device or the second controlled device to deactivate.

16. A method comprising:
controlling, by a computing device, a controlled device that is configured to control an environmental condition;
receiving, by a first user interface, a first input from a user, wherein the input is associated with environmental control of a first zone;
transmitting, by the first user interface, a first signal to the computing device, wherein the signal is associated with the controlled device; and
receiving, by a second user interface, a second input from the user, wherein the input is associated with environmental control of a second zone;
wherein the second user interface is in communication with the first user interface such that the first user interface transmits a second signal to the computing device for controlling a second controlled device responsive to predicting a condition in the second zone, and wherein the computing device comprises a zone control panel separate from the first user interface and the second user interface;
wherein predicting the condition in the second zone is based on comparing, by the first user interface, the environmental condition in the first zone to an environmental setpoint corresponding to the first zone.

17. The method of claim 16, further comprising receiving, by the first user interface, information about the environmental condition from a sensor;
making a determination of whether the environmental condition is at or near a setpoint; and
transmitting, by the first user interface, the determination to the computing device.

18. The method of claim 17, wherein the setpoint is based on input from the user.

* * * * *